(12) United States Patent
Hahn et al.

(10) Patent No.: US 6,957,943 B2
(45) Date of Patent: Oct. 25, 2005

(54) STACKING DEVICE FOR A MACHINE FOR PROCESSING SHEETS AND METHOD FOR STACKING SHEETS IN ONE SUCH MACHINE

(75) Inventors: Thilo Hahn, Dettelbach (DE); Kurt Georg Nagler, Zell/Main (DE); Johannes Georg Schaede, Würzburg (DE); Peter Eugen Wagner, Grünsfeld (DE)

(73) Assignee: KBA-Giori S.A., Lausanne (CH)

( * ) Notice: Subject to any disclaimer, the term of this patent is extended or adjusted under 35 U.S.C. 154(b) by 0 days.

(21) Appl. No.: 10/477,255

(22) PCT Filed: Apr. 4, 2002

(86) PCT No.: PCT/DE02/01222

§ 371 (c)(1),
(2), (4) Date: Dec. 23, 2003

(87) PCT Pub. No.: WO02/092485

PCT Pub. Date: Nov. 21, 2002

(65) Prior Publication Data

US 2004/0161329 A1    Aug. 19, 2004

(30) Foreign Application Priority Data

May 12, 2001   (DE)   ................................ 101 23 326

(51) Int. Cl.$^7$ ............................................. B65G 57/00
(52) U.S. Cl. ................................... 414/788.7; 927/929
(58) Field of Search .......................... 414/788.4, 788.7, 414/927, 928, 929

(56) References Cited

U.S. PATENT DOCUMENTS 3,907,274 A        9/1975   D Amato

FOREIGN PATENT DOCUMENTS

| CH | 464238 A | 10/1968 |
|---|---|---|
| DE | 4208547 A | 10/1993 |

*Primary Examiner*—Khoi H. Tran
(74) *Attorney, Agent, or Firm*—Clifford W. Browning; Woodard, Emhardt, Moriarty, McNett & Henry LLP

(57) ABSTRACT

The invention relates to a stacking device for a machine for processing sheets, especially a sheet printing machine. Said device can be displaced between a first stacking position (02) and a second stacking position (03), and comprises carriers for a pallet receiving the stacked sheets in the first stacking position (02) and the second stacking position (03). The inventive device also comprises transport units (14, 16, 18) for transporting the pallets (09, 21) from each stacking position (02, 03) to a single pile of pallets (11), and for stacking the pallets (12, 19) in the pile of pallets (11).

12 Claims, 3 Drawing Sheets

Figure 1:
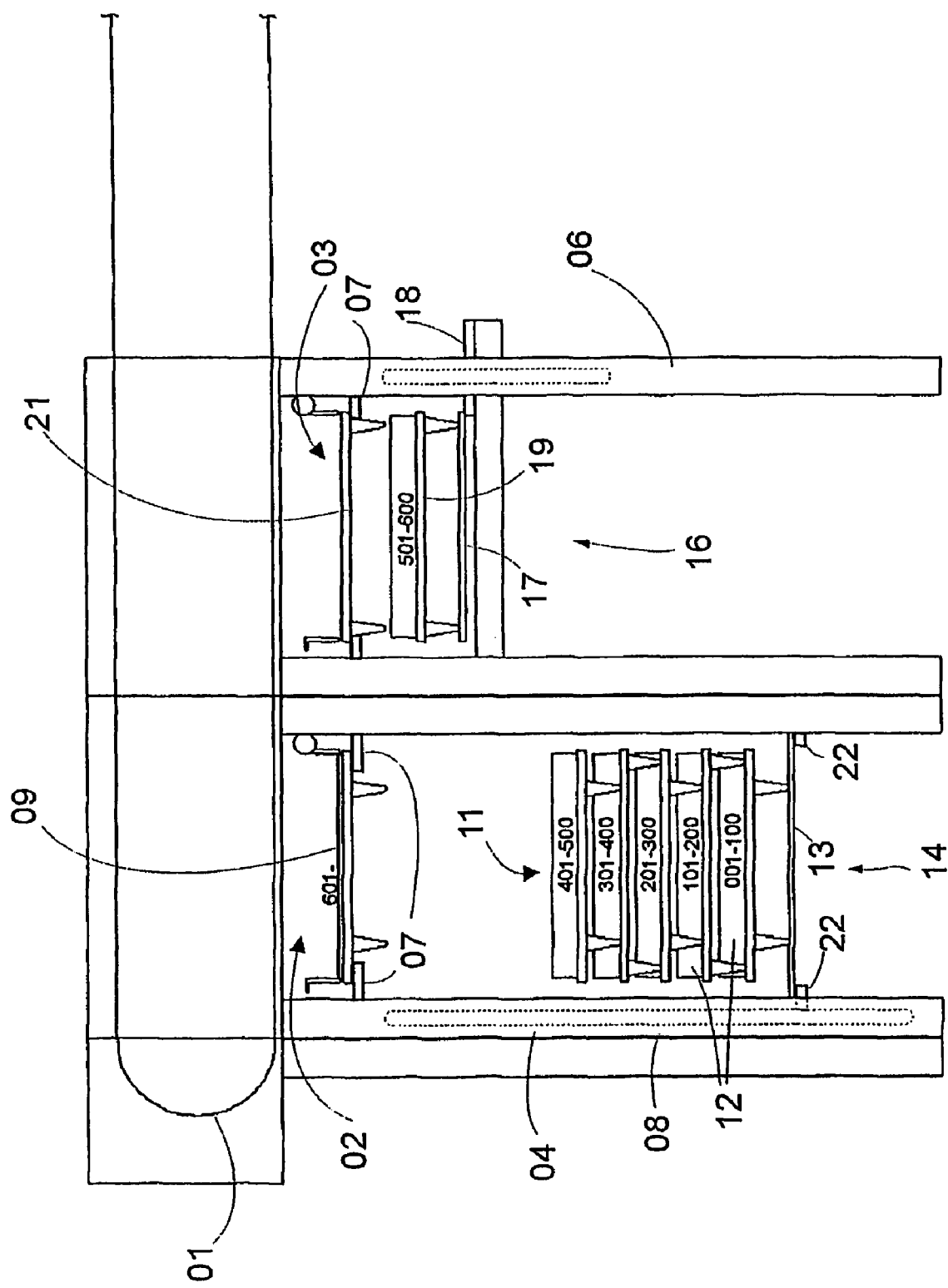

STACKING DEVICE FOR A MACHINE FOR PROCESSING SHEETS AND METHOD FOR STACKING SHEETS IN ONE SUCH MACHINE

The invention relates to a stacking device for a machine for processing sheets and a method for stacking sheets in a machine for processing sheets according to the pre-characterising clause of claim 1 or 8.

A stacking device serves for piling up printed sheets to form a stack at the outlet from a machine for processing sheets, the stack being transported away for further processing once it has reached a predetermined height. Whilst the stack is being transported away no further sheets can be deposited on the stack. In order to avoid enforced interruption of the sheet processing, stacking devices for sheet-fed printing machines have been developed which have two stacking positions on which sheet stacks can be formed and which can be switched between sheet stacking at the first stacking position and sheet stacking at the second stacking position. When, in the case of such a stacking device, a sheet stack needs to be transported away, it is sufficient merely to switch the stacking to the other stacking position, so that a new sheet stack is accumulated at this position. Whilst this is being done the finished stack can be transported away.

Using such a known stacking device it is possible to form sheet stacks containing many hundreds to many thousands of sheets. The number of sheets is essentially limited solely by the stack height up to which the sheet stack remains stable with no risk of toppling over. This gives rise to the problem with some printing processes, however, that the printing ink is not yet fully dry at the time of sheet stacking. When the sheets are stacked in the stacking device, the sheets in the interior of a stack scarcely have time to dry, so that in tall stacks the pressure to which the lower sheets are subjected may cause these sheets to adhere to one another resulting in the transfer of ink from one sheet to the other.

In order to counter this risk, U.S. Pat. No. 3,907,274, for example, has proposed a stacking device according to the pre-characterising part of claim 1, in which the sheets are in each case stacked on a bed plate of a pallet, where they form a low stack in which there is no risk of sheets adhering together and of ink being transferred. When a pallet is full, that is to say when the stack thereon has reached a predetermined height, it is lowered in the stacking device and is replaced by a fresh pallet. The full pallets are stacked one on top of another to form a pallet stack in which each pallet is supported by its feet on a bed plate of a pallet underneath without placing any load on the sheet stack situated thereon.

The stacking process is of necessity interrupted each time a fresh pallet is inserted. In order not to have to interrupt the operation of an upstream printing machine therefore, the stacking device disclosed by U.S. Pat. No. 3,907,274 A also has two stacking positions and the stream of sheets is switched from one stacking position to the other each time a fresh pallet needs to inserted at one of the positions.

In the production of numbered printed products, assuming that n sheets are stacked on each pallet and the sheets are numbered starting from 1, such a mode of operation will mean that a first pallet at the first stacking position receives the sheets 1 to n, the first pallet at the second stacking position the sheets n+1 to 2n, the second pallet at the first stacking position the sheets 2n+1 to 3n, etc. This is to say the pallet stacks which are formed at the two stacking positions respectively contain sheets 1 to n, 2n+1 to 3n, 4n+1 to 5n . . . and n+1 to 2n, 3n+1 to 4n, etc. Continuous numbering of the sheets is thereby forfeited. This makes any completeness check on the sheets at a later stage in their processing more difficult. Such a completeness check is extremely important, however, particularly when the sheets are being printed with bank notes or similar pecuniary instruments.

CH 464 238 A discloses a sheet delivery device having two stacking tables arranged in tandem. The rear stacking table is assigned to an auxiliary stacking device, by means of which deposited sheets are moved from an upper stacking position of the auxiliary stacking table on to a lower position of the rear main stack where they are deposited on the main stack.

DE 42 08 547 A1 describes a device for stacking corrugated cardboard panels, in which a stack is formed in a first stacking position. This stack is then transported to a second stacking position and further panels are deposited thereon.

The object of the invention is to create a stacking device for a machine for processing sheets and a method for stacking sheets in a machine for processing sheets capable of stacking continuous sheets.

According to the invention this object is achieved by the features of claim 1 or claim 9.

The advantages achievable by means of the invention reside particular in the fact that, despite the facility for uninterrupted printing, a single sheet stack is obtained in which the sheets succeed one another in the same order in which they reached the stacking device, so that any numbering of the sheets remains unaltered.

For this purpose the stacking device has transport units for transporting pallets from each of the stacking positions to a single stack and for stacking the pallets on this stack. This stack is preferably provided vertically below the first stacking position, and a first transport unit is designed for lowering a pallet vertically from the first stacking position on to the stack. Furthermore, a second and a third transport unit are suitably provided, which are designed for lowering a pallet vertically from the second stacking position into an intermediate position and for shifting the pallet from the intermediate position to the stack. This third transport unit is preferably arranged on an intermediate level between the second stacking position and the top of the stack, and transfers a pallet to the first transport unit, which deposits the pallet on the stack.

A height-adjustable carrier is suitably provided for the stack, so that the top of the stack can be kept at a constant level until the stack has reached a predetermined number of pallets and needs to be transported away.

An especially simple design construction is achieved if the height adjustment facility of the stack carrier is provided by the first transport unit.

The stacking device is suitably operated so that in each instance a number of sheets is stacked on a pallet at one of the stacking positions, before switching to the stacking of a further number of sheets at the other stacking position, and the pallet is transported from the one stacking position to the stack whilst sheets are being stacked at the other stacking position. During transport the next pallet is being filled at the other stacking position and as soon as this is full stacking is resumed at the one stacking position in order to now transport the pallet from the other stacking position to the stack.

An example of an embodiment of the invention is represented in the drawing and is described in more detail below.

Figure 2:
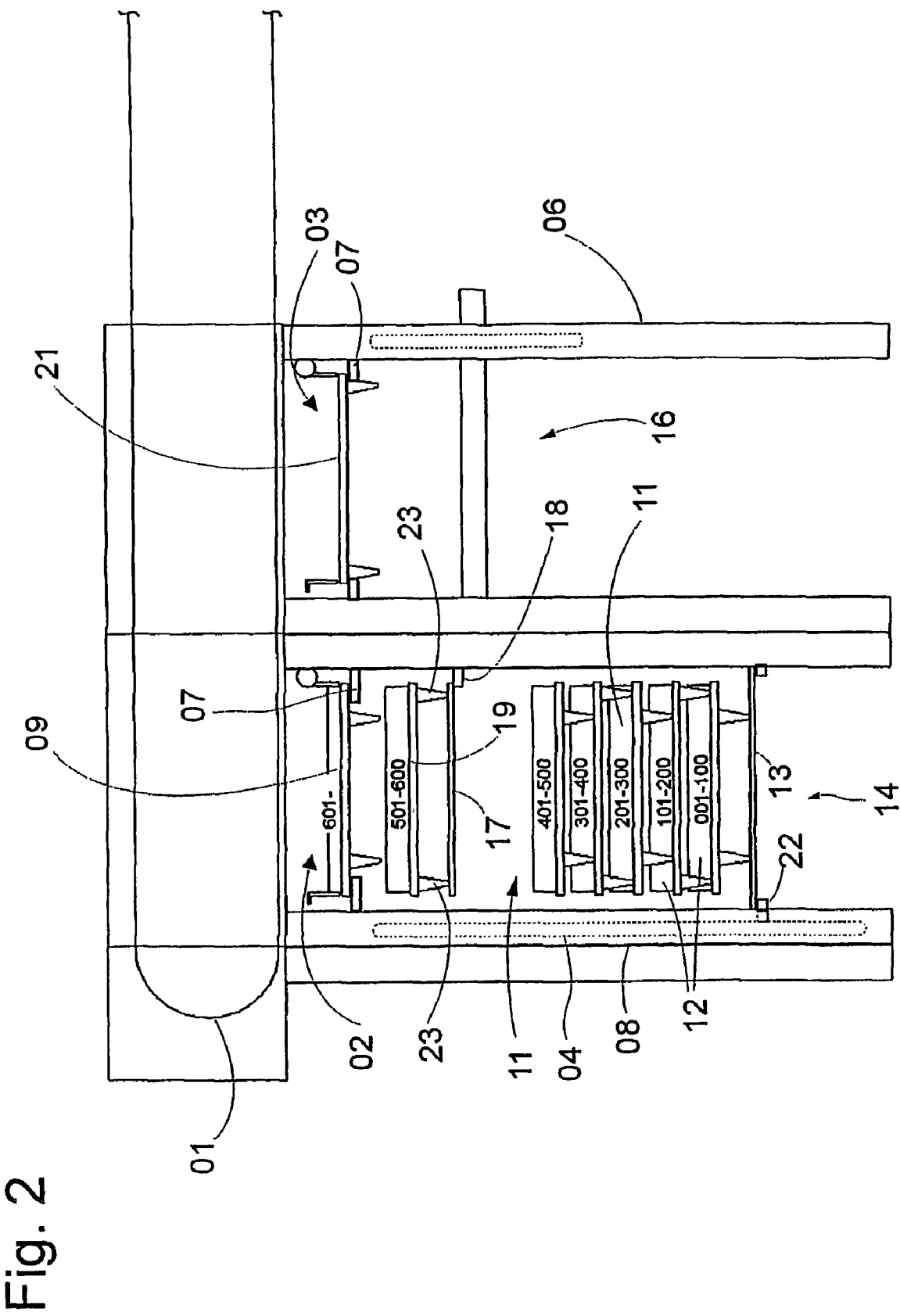
Figure 3:
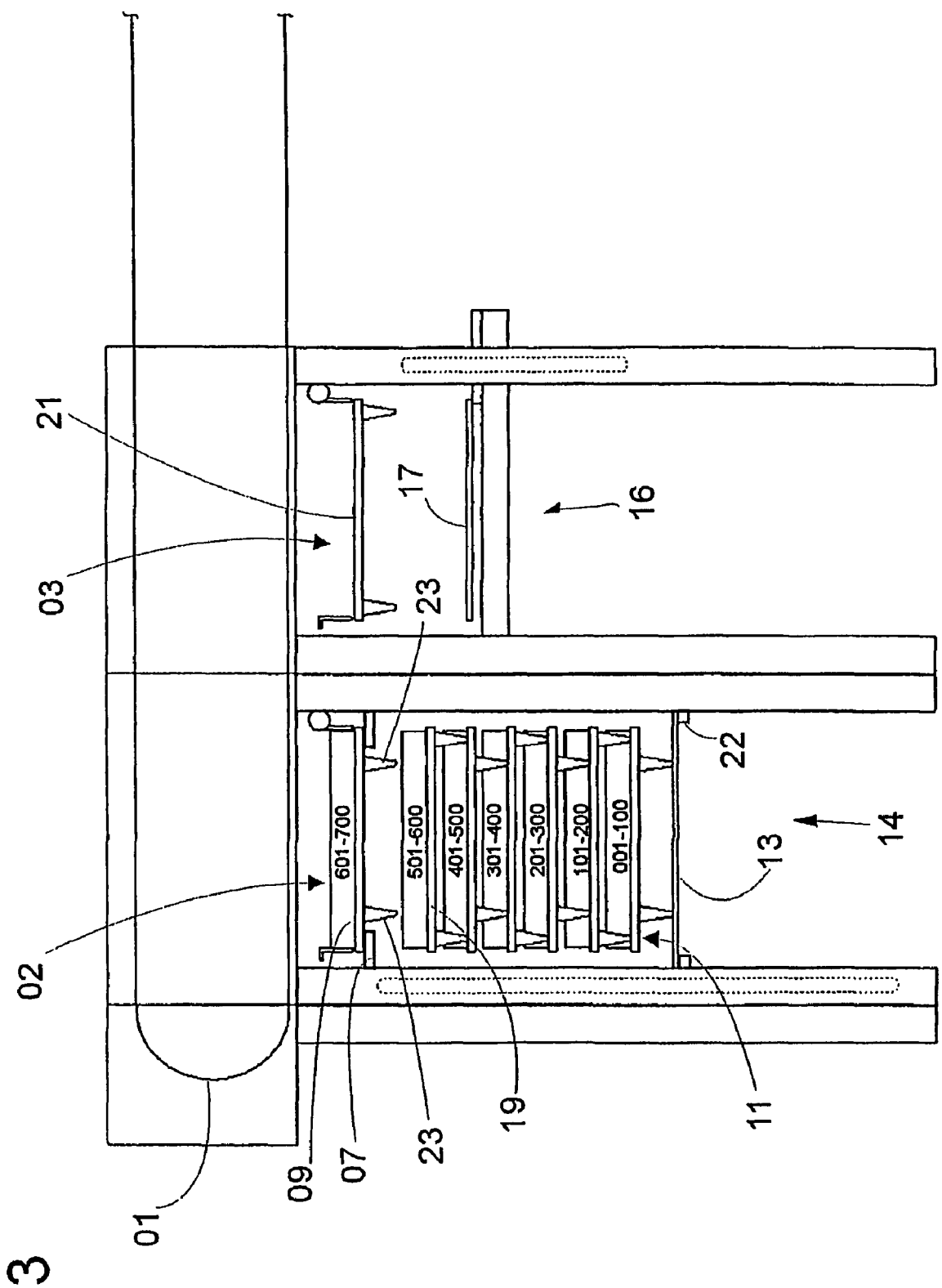

In the drawing:

FIG. 1 to 3 show schematic side views of a stacking device in three phases of its operation.

The stacking device comprises a sheet delivery device having an endless delivery chain 01, the path of which is represented schematically in FIG. 1. Mounted at fixed intervals on the delivery chain 01 in a manner known in the art are chain gripper systems, the construction of which is disclosed, for example, by EP 07 09 329 B1 and which are not shown in FIG. 1 Each chain gripper system essentially comprises a cross-piece, which is provided with a number of grippers, which can be controlled in order to clamp a sheet leading edge of a printed sheet at a receiving position (not shown) and to release it at a stacking position 02, 03. The two stacking positions 02; 03 are situated in the upper area of two adjacent carrier frames 04; 06. In their upper area the carrier frames 04; 06 each have horizontally displaceable or pivoting support arms 07, which are each mounted on four rails 08 arranged at the corners of the carrier frames 04; 06 and in their retracted position inside the carrier frames 04; 06 shown in FIG. 1 each support a pallet 09; 21.

A pallet stack 11, in this example comprising five pallets 12, is accumulated on a plate 13 that can be displaced upwards and downwards on the rails 08 of the first carrier frame 04. A first transport unit 14 for driving the vertical movement of the plates 13 may be formed, for example, by motor-driven endless chains accommodated in the rails 08 and each having a support arm 22 fitted thereto for supporting the plate 13, as is represented schematically in the front left-hand rail 08 of the carrier frame 04.

A second transport unit 16 for the vertical movement of pallets 19 is also fitted in the second carrier frame 06. Its vertical lift is smaller than that of the first transport unit 14. A plate 17 of the second transport unit 16 that serves for carrying a pallet 19 is horizontally displaceable by means of a third transport unit 18.

At the operating stage of the stacking device shown in FIG. 1 there are five pallets 12 on the plate 13, which are each laden with stacks of 100 numbered sheets. The bottom pallet 12 carries the sheets delivered first and bearing numbers 1 to 101, the pallet above those bearing numbers 101 to 200 etc. up to the fifth pallet 12 carrying sheets 401 to 500. A pallet 19 laden with sheets 501 to 600 has just been lowered from the stacking position 03 by the second transport unit 16, and at the stacking position 03 previously occupied by this pallet the empty pallet 21 has been inserted either manually or by a feed mechanism (not shown). Since no stacking can be performed at the second stacking position 03 whilst the full pallet 19 is being lowered and the fresh pallet 21 inserted, the device has been switched to sheet stacking at the first stacking position 02, where a further sheet stack is being accumulated on the pallet 09 starting with sheet 601.

In the operating phase shown in FIG. 2 the second transport unit 16 has lowered the pallet 17 to the lower end of its range of movement, and has shifted the third transport unit 18 together with the pallet 19 into the first carrier frame 04, so that the pallet 19 aligns vertically with the pallet stack 11. The process of stacking sheets onto the pallet 09 meanwhile continues.

The first transport unit 14 then begins to raise the pallet stack 11, so that feet 23 of the pallet 19 come to rest on the top pallet 12 of the pallet stack 11. The third transport unit 18 draws the pallet 17, thereby relieved, back into the second carrier frame 06.

When this has happened, the first transport unit 14 continues the upwards movement of the pallet stack 11, as shown in FIG. 3. The pallet 19 is here situated above the level of the plate 17 and just below the pallet 09, in the meantime fully laden with sheets 601 to 700. From this point onwards the gripper systems of the delivery chain will be actuated in order to deliver the sheets carried thereby to the pallet 21 at the second stacking position 03.

As the first transport unit 14 raises the plate 13 beyond the position shown in FIG. 3, the feet 23 of the pallet 09 finally come to rest on the pallet 19. The support arms 07, now relieved, are retracted in order to allow the pallet 09 to travel downwards. The pallet stack 11 now comprising seven pallets 12 is lowered again and a further pallet, which will be loaded with sheets 801 to 900 as soon as the pallet 21 is fully laden, can be placed on the support arms 07 which are then run out again.

The cyclically alternate loading of pallets at the two stacking positions 02; 03 and alternate bringing together of the laden pallets creates a pallet stack 11 in which the sheets are numbered continuously from bottom to top.

| Reference numbers | |
|---|---|
| 01 | Delivery chain |
| 02 | Stacking position |
| 03 | stacking position |
| 04 | Carrier frame |
| 05 | — |
| 06 | Carrier frame |
| 07 | Support arm |
| 08 | Rail |
| 09 | Pallet |
| 10 | — |
| 11 | Pallet stack |
| 12 | Pallet |
| 13 | Plate |
| 14 | Transport unit, first |
| 15 | — |
| 16 | Transport unit, second |
| 17 | Plate |
| 18 | Transport unit, third |
| 19 | Pallet |
| 20 | — |
| 21 | Pallet |
| 22 | Support arm |
| 23 | Foot |

What is claimed is:

1. Stacking device for a sheet processing machine, wherein
   the stacking device can be switched between a first stacking position and a second stacking position,
   the first stacking position and the second stacking position are arranged one behind the other relative to a transport direction of the sheets,
   the first stacking position and the second stacking position are each provided with a pallet, on which sheets are deposited and stacked,
   a single pallet stack is arranged in the stacking device,
   transport means are designed for transporting alternately one pallet with sheets deposited thereon from the first or second stacking position to the single pallet stack and for stacking said pallet on the single pallet stack whilst sheets are deposited on another pallet in another one of said first and second stacking positions.

2. Stacking device according to claim 1, wherein the single pallet stack is provided vertically below the first stacking position and wherein said transport means comprise a first transport unit which is designed for vertically lowering a pallet from the first stacking position onto the single pallet stack.

3. Stacking device according to claim 2, wherein said transport means further comprise a second transport unit which is designed for vertically lowering a pallet from the second stacking position into an intermediate position and a third transport unit which is designed for shifting the pallet from the intermediate position to the single pallet stack.

4. Stacking device according to claim 3, wherein the third transport unit is arranged on an intermediate level between the second stacking position and top of the pallet stack and transfers a pallet to the first transport unit.

5. Stacking device according to claim 1, wherein said stacking device has a height-adjustable support arm for the pallet stack.

6. Stacking device according to claim 2, wherein said stacking device has a height-adjustable support arm for the pallet stack.

7. Stacking device according to claim 6, wherein a height adjustment facility of the support arm is provided by the first transport unit.

8. Method for stacking sheets by means of a stacking device in a machine for processing sheets, a plurality of sheets being deposited either at a first stacking position or a second stacking position arranged behind the first stacking position relative to a transport direction of the sheets, and a plurality of deposited sheets being transported from the second stacking position to the first stacking position, a number of sheets in each instance being stacked on a pallet at the second stacking position, before switching to the stacking of a number of sheets at the first stacking position, and the pallet being transported from the second stacking position to a pallet stack in the first stacking position whilst sheets are being stacked at the first stacking position.

9. Stacking device for a sheet processing machine, wherein the stacking device can be switched between a first stacking position and a second stacking position, the first stacking position and the second stacking position are arranged one behind the other relative to a transport direction of the sheets, the first stacking position and the second stacking position are each provided with a pallet on which sheets are deposited and stacked, a single pallet stack is arranged in the first stacking position, wherein transport means are designed for transporting pallets from each of the stacking positions to the single pallet stack and for stacking the pallets on the single pallet stack, wherein the single pallet stack is provided vertically below the first stacking position, wherein said transport means comprise:

a first transport unit which is designed for vertically lowering a pallet from the first stacking position onto the single pallet stack, a second transport unit which is designed for vertically lowering a pallet from the second stacking position into an intermediate position, and a third transport unit which is designed for shifting the pallet from the intermediate position to the single pallet stack.

10. Stacking device according to claim 9, wherein the third transport unit is arranged on an intermediate level between the second stacking position and top of the pallet stack and transfers a pallet to the first transport unit.

11. Stacking device according to claim 9, wherein said stacking device has a height-adjustable support arm for the pallet stack.

12. Stacking device according to claim 11, wherein a height adjustment facility of the support arm is provided by the first transport unit.

* * * * *